United States Patent
Myers et al.

(10) Patent No.: US 7,031,553 B2
(45) Date of Patent: Apr. 18, 2006

(54) METHOD AND APPARATUS FOR RECOGNIZING TEXT IN AN IMAGE SEQUENCE OF SCENE IMAGERY

(75) Inventors: Gregory K. Myers, San Francisco, CA (US); Robert C. Bolles, Mountain View, CA (US); Quang-Tuan Luong, Menlo Park, CA (US); James A. Herson, Emerald Hills, CA (US)

(73) Assignee: SRI International, Menlo Park, CA (US)

( * ) Notice: Subject to any disclaimer, the term of this patent is extended or adjusted under 35 U.S.C. 154(b) by 464 days.

(21) Appl. No.: 09/895,868

(22) Filed: Jun. 29, 2001

(65) Prior Publication Data

US 2002/0051575 A1    May 2, 2002

Related U.S. Application Data

(60) Provisional application No. 60/234,813, filed on Sep. 22, 2000.

(51) Int. Cl.
*G06K 9/36* (2006.01)
(52) U.S. Cl. .................. 382/289; 382/290; 382/174
(58) Field of Classification Search ............... 382/181, 382/289, 290, 295, 296, 105, 173, 174, 176, 382/202, 177, 229, 143; 348/147, 144, 143
See application file for complete search history.

(56) References Cited

U.S. PATENT DOCUMENTS

| | | | | |
|---|---|---|---|---|
| 5,497,236 A | * | 3/1996 | Wolff et al. | 358/296 |
| 5,506,918 A | * | 4/1996 | Ishitani | 382/289 |
| 5,613,016 A | * | 3/1997 | Saitoh | 382/174 |
| 5,764,383 A | * | 6/1998 | Saund et al. | 358/497 |
| 5,835,241 A | * | 11/1998 | Saund | 358/488 |
| 6,014,470 A | * | 1/2000 | Matsuda | 382/275 |
| 6,035,064 A | * | 3/2000 | Nakao et al. | 382/200 |
| 6,081,206 A | * | 6/2000 | Kielland | 340/937 |
| 6,137,905 A | * | 10/2000 | Takaoka | 382/173 |
| 6,363,381 B1 | * | 3/2002 | Lee et al. | 707/6 |
| 6,473,517 B1 | * | 10/2002 | Tyan et al. | 382/105 |
| 6,640,010 B1 | * | 10/2003 | Seeger et al. | 382/229 |

FOREIGN PATENT DOCUMENTS

| | | |
|---|---|---|
| EP | 0 702 329 | 3/1996 |
| EP | 0 877 335 | 11/1998 |

OTHER PUBLICATIONS

Baird, H., "The Skew Angel of Printed Documents," SPSE Annual Conference, 1987, p21-24.

(Continued)

*Primary Examiner*—Yon J. Couso
(74) *Attorney, Agent, or Firm*—Kin-Wah Tong, Esq.; Patterson & Sheridan, LLP

(57) ABSTRACT

An apparatus and a concomitant method for detecting and recognizing text information in a captured imagery. The present method transforms the image of the text to a normalized coordinate system before performing OCR, thereby yielding more robust recognition performance. The present invention also combines OCR results from multiple frames, in a manner that takes the best recognition results from each frame and forms a single result that can be more accurate than the results from any of the individual frames.

8 Claims, 9 Drawing Sheets

OTHER PUBLICATIONS

Messelodi, et al., "Automatic Identification An Skew Estimation Of Text Lines In Real Scene Images", Pattern Recognition 32(5), 1999, p791-810.

Myers, et al., "Recognition of Text in 3-D Scenes," 4th Symp on Document Image Understanding Technology, Apr. 23-25, 2001.

Communication Relating to the Results of the Partial International Search, Intl Appl No. PCT/US01/29768.

"Translation Camera", by Yasuhiko Watanabe et al; Dept. of Electron & Information, Ryukoku University; Pattern Recognition; Fourteenth International Conference, Aug. 1998, pp. 613-617 vol. 1.

\* cited by examiner

METHOD AND APPARATUS FOR RECOGNIZING TEXT IN AN IMAGE SEQUENCE OF SCENE IMAGERY

This application claims the benefit of U.S. Provisional Application No. 60/234,813 filed on Sep. 22, 2000, which is herein incorporated by reference.

This invention was made with Government support under Contract Nos. 2000-S112000-000 and 97-F132600-000, awarded by Advanced Research and Development Activity (ARDA) and DST/ATP/Office of Advanced Analytic Tools respectively. The Government has certain rights in this invention.

The present invention relates to an apparatus and concomitant method for digital image processing. More specifically, the present invention provides text recognition in an image sequence of scene imagery, e.g., three-dimensional (3D) scenes of the real world.

BACKGROUND OF THE DISCLOSURE

Digital still cameras and digital video cameras permit imagery to be stored and displayed for human viewing. However, the captured digital imagery contains information that, if automatically extracted, could be used for other purposes. Information about real-world scenery imaged by the camera, such as text appearing in the scene, could then be processed and/or disseminated by new computing-based applications.

Additionally, the volume of collected video data is expanding at a tremendous rate. A capability to automatically characterize the contents of video imagery would enable video data to be indexed in a convenient and meaningful way for later reference, and would enable actions (such as automatic notification and dissemination) to be triggered in real time by the contents of streaming video. Methods of realizing this capability that rely on the automated recognition of objects and scenes directly in the imagery have had limited success because (1) scenes may be arbitrarily complex and may contain almost anything, and (2) the appearance of individual objects may vary greatly with lighting, point of view, etc. It has been noted that the recognition of text is easier than the recognition of objects in an arbitrarily complex scene, because text was designed to be readable and has a regular form that humans can easily interpret.

However, research in text recognition for both printed documents and other sources of imagery has generally assumed that the text lies in a plane that is oriented roughly perpendicular to the optical axis of the camera. However, text such as street signs, name plates, and billboards appearing in captured video imagery often lies in a plane that is oriented at an oblique angle, and therefore may not be recognized very accurately by conventional optical character recognition (OCR) methods. Therefore, a need exists in the art for an apparatus and method to take advantage of 3-D scene geometry to detect the orientation of the plane on which text is printed, thereby improving text detection and extraction.

Additionally, in video data of text appearing in real-world scenery, the text usually persists in the scene for some length of time, and therefore appears in multiple video frames. Digitized video frames of the same scene may vary slightly, thereby causing an OCR process operating on individual frames to produce slightly different results. Therefore, a need exists for a method that combines OCR results from multiple images to produce a single, accurate result for a single instance of text.

SUMMARY OF THE INVENTION

The present invention is an apparatus and a concomitant method for detecting and recognizing text information in video imagery or in a sequence of images. In one embodiment, the present invention transforms the image of the text to a normalized coordinate system before performing OCR, thereby yielding more robust recognition performance. In a second embodiment, the present invention also combines OCR results from multiple frames, in a manner that takes the best recognition results from each frame and forms a single result that can be more accurate than the results from any of the individual frames.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
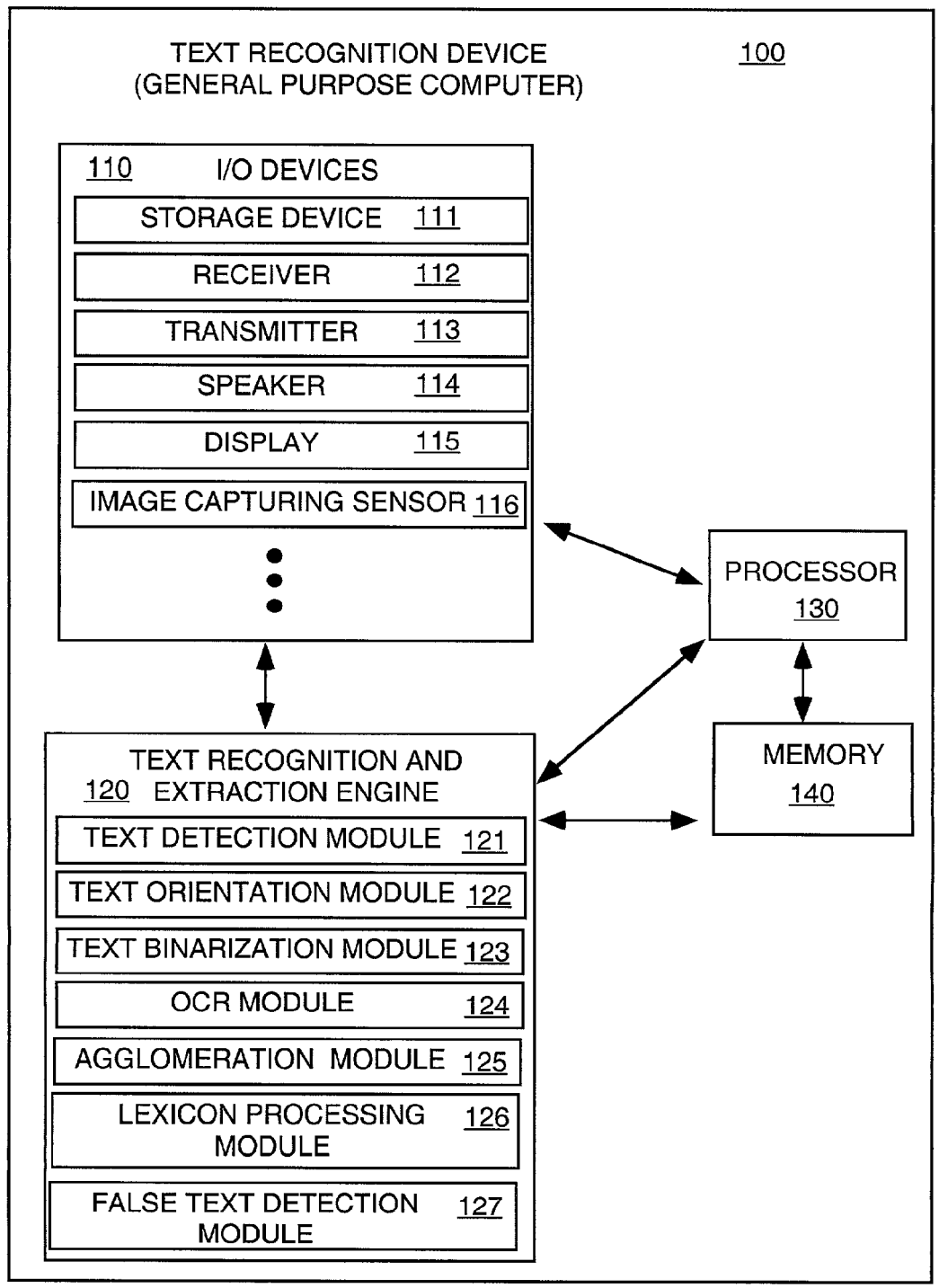
FIG. 1 illustrates a block diagram of a text recognition system of the present invention.

FIG. 1 illustrates a block diagram of a text recognition device or system 100 of the present invention. In one embodiment, the text recognition device or system 100 is implemented using a general purpose computer or any other hardware equivalents. Although the recognition device or system 100 is preferably implemented as a portable device, it should be noted that the present invention can also be implemented using a larger computer system, e.g., a desktop computer or server.

Thus, text recognition device or system 100 comprises a processor (CPU) 130, a memory 140, e.g., random access memory (RAM) and/or read only memory (ROM), a text recognition and extraction engine 120, and various input/output devices 110, (e.g., storage devices 111, including but not limited to, a tape drive, a floppy drive, a hard disk drive or a compact disk drive, a receiver 112, a transmitter 113, a speaker 114, a display 115, an image capturing sensor 116, e.g., digital still camera or video camera, a keyboard, a keypad, a mouse, and the like).

It should be understood that the text recognition and extraction engine 120 can be implemented as physical devices that are coupled to the CPU 130 through a communication channel. Alternatively, the text recognition and extraction engine 120 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 140 of the computer. As such, the text recognition and extraction engine 120 (including associated methods and data structures) of the present invention can be stored on a computer readable medium, e.g., RAM memory, magnetic or optical drive or diskette and the like.

The text recognition and extraction engine 120 comprises a text detection module 121, a text orientation module 122, a text binarization module 123, an optical character recognition (OCR) module 124, an agglomeration module 125, a lexicon processing module 126, and a false text detection module 127. In operation, the text recognition and extraction engine 120 is able to accurately detect and extract text information from an input image or video imagery. A detailed description of the functions of the text recognition and extraction engine 120 is disclosed below with reference to FIG. 2. The text results from the text recognition and extraction engine 120 is then provided to the processor 130 for further processing to provide various functionalities or services. These functionalities or services include, but are not limited to, automatic text recognition with audio playback or visual display (e.g., street signs, placards, restaurant menus, billboards, white boards, labels, or books), automatic text translation to a foreign language, automatic access to auxiliary information, automatic road sign reading for navigation, automatic license plate reading for law enforcement functions, image and video indexing and archiving and inventory and shelf restocking control. Examples of such portable text recognition devices are disclosed in US patent application entitled "Method And Apparatus For Portably Recognizing Text In An Image Sequence Of Scene Imagery" with attorney docket SRI/4348-2, which is herein incorporated by reference and is filed simultaneously herewith.

Figure 2:
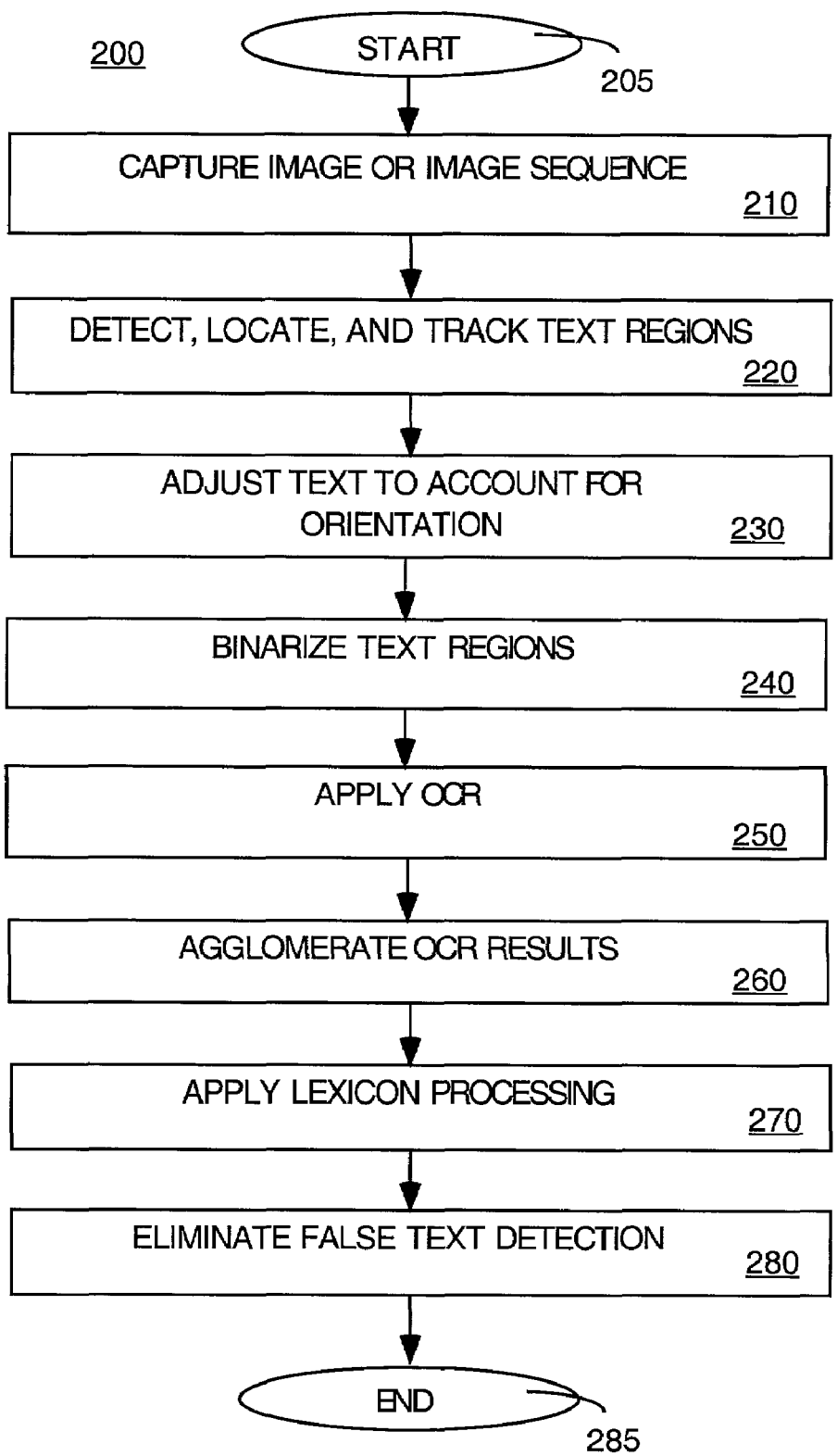
FIG. 2 illustrates a method of text recognition and extraction in accordance with the text recognition system of the present invention.

FIG. 2 illustrates a method 200 for text recognition and extraction in accordance with the present invention. Specifically, the method is designed for detecting and reading text appearing in video or still imagery. This invention is concerned with reading text that is in the scene itself (such as a sign on a building). However, the present techniques could also be applied to computer-generated text caption overlays (such as that which appears in broadcast news videos). The system 100 of FIG. 1 employing method 200 can accept a video or still image signal and recognize text in real time. It should be noted that the term "captured imagery" in the present application may encompass, in part or in whole, a still image and/or an image sequence.

Method 200 starts in step 205 and proceeds to step 210, where an image or an image sequence (e.g., video) is captured via conventional equipment, e.g., image capturing sensor 116 (e.g., digital still camera or digital video camera). Alternatively, step 210 can be omitted if the captured imagery was previously captured and is simply being retrieved from a storage device 111.

In step 220, method 200 detects, locates, and tracks text regions within the captured imagery. More specifically, method 200 approaches text detection and location with the assumption that the text is roughly horizontal, and that the characters have a minimum contrast level compared with the image background. The text may be of either polarity (light text on a dark background, or dark text on a light background). The method first detects vertically oriented edge transitions in the gray-scale image, using a local neighborhood edge operator. The output of the operator is thresholded to form two binary images, one for dark-to-light transitions (B1), and the other for light-to-dark transitions (B2). A connected components algorithm is applied on each binary image. The connected components that have been determined (by examining their height and area) not due to text are eliminated. The remaining connected components are linked to form lines of text by searching the areas to the left and right of each connected component for additional connected components that are compatible in size and relative position. Finally, a rectangle is fitted to each line of detected text or a group of lines of text using the moments of all connected components used to locate the text. Tracking text over multiple consecutive video frames is achieved by computing the frame-to-frame displacement of the pixels in a set of local neighborhoods, or finding and following distinctive shape features, such as the ends of character strokes, and then computing a geometric transformation that characterizes the frame-to-frame displacement of corresponding text regions.

Figure 4:
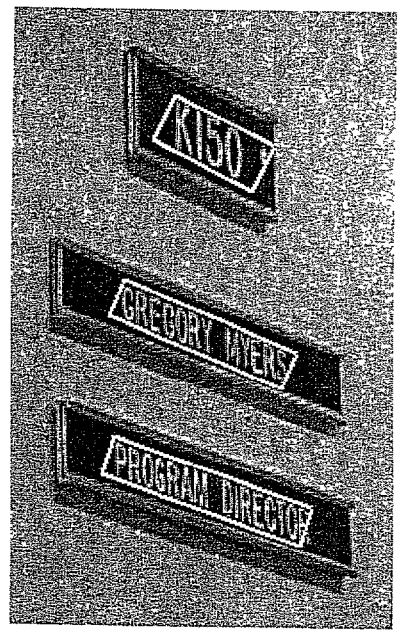
FIG. 4 illustrates text that appears to be rotated in the image plane.

Returning to FIG. 2, in step 230, method 200 adjusts detected text to account for orientation. Namely, text in a captured imagery is often viewed from an oblique angle as shown in FIG. 4 below. Such a configuration is quite common when the main subject of the scene is not the text itself, but such incidental text could be quiet important (for example, it may be the only clue of the location of the captured imagery). Thus, method 200 applies a processing step in step 230 to account for text orientation, thereby improving the OCR method that will be applied at a later processing stage. A detailed description of step 230 is provided below.

In step 240, method 200 binarizes the detected text regions. Binarization is performed on each text line independently. It is assumed that the text pixels are relatively homogeneous, and that the intensity of the background pixels may be highly variable. For each text line, the polarity of text is first determined, and then binarization of the text line is performed.

The polarity is determined by comparing grayscale pixel values above and below the baselines. This relies on the inside pixels (those below the top and above the bottom baselines) most likely being character pixels and the outside pixels (those above the top and below the bottom baseline) most likely being background pixels. The polarity calculation compares pairs of pixels along both baselines and sums the number of times the inside pixel is greater than the outside pixel. If this sum is greater than zero, the polarity is determined to be light text on a dark background; otherwise, the polarity is determined to be dark text on a light background.

In binarization, the gray-scale image is smoothed with a Gaussian kernel, and histograms H1 and H2 are computed. Histogram H1 is composed of gray-scale pixels in the smoothed image on the right side of the connected components in the dark-to-light edge transition image B1 and on the left side of the light-to-dark edge transition image B2. If light text is in this text region, these are the pixels most likely to belong to light text or near the edge of light text. Similarly, histogram H2 is composed of gray-scale pixels in the smoothed image on the right side of the connected components in image B2 and on the left side of the image B1. The threshold for the text line is then set to the gray value at the $60^{th}$ percentile of histogram H1 or H2, depending on the polarity chosen. Alternatively, more than one binarizaton result for each text line is produced, each using a different threshold value (e.g., 45th percentile, 60th percentile, and 75th percentile). Producing more than one binarization result, and sending them through the OCR process (Step 250) can, after combining the OCR results with agglomeration (Step 260), sometimes yield more accurate results than processing a single binarization result.

Returning to FIG. 2, in step 250, method 200 applies OCR processing to the binarized text regions. In one embodiment, step 250 is achieved by using a commercially available OCR engine, e.g., OCR package from Scansoft, Inc. of Peabody, Mass. However, it should be noted the present invention is not so limited and that other OCR packages may also be used. It should be noted that some OCR engines operate on a gray-scale imagery instead of binary images and therefore would not require the processing in step 240. The OCR engine produces one or more candidate identities for each recognized text character in the image, rank-ordered according to likelihood.

In step 260, method 200 agglomerates the OCR results. Specifically, a video text recognition process usually involves performing optical character recognition (OCR) on images derived from individual video frames. However, in many applications the same text persists in the scene for some length of time. Digitized video frames of the same scene may vary slightly, thereby causing an OCR process operating on individual frames to produce slightly different results. Therefore, method 200 combines ("agglomerates") OCR results from multiple frames, in a manner that takes the best recognition results from each frame and forms a single result. The use of agglomeration improves the recognition accuracy over that of the OCR results on individual images. It also enables the system to avoid outputting the same results repeatedly when the text is persistent in the video sequence for many frames, and reduces the generation of false characters from non-text image regions. In addition, because the agglomeration process works on OCR results (as opposed to image pixels) from multiple frames, it is computationally fast enough to implement in a real-time system (i.e., one that keeps up with the video display rate).

In general, method 200 uses the frame-to-frame displacement determined in Step 220 to find character-to-character correspondence between OCR results in multiple consecutive frames. The agglomeration process selects the most likely character identity in each set of corresponding characters, and therefore the combined result will tend to be more accurate than any of the results from the individual frames.

Specifically, the input to this process is a series of output structures (one for each processed frame) from an OCR engine which produces multiple candidate identities for each recognized text character in the image rank-ordered according to likelihood. A confidence value or probability is associated with the top-ranked character, each of the other candidate characters may also have a confidence value or probability. The output is a series of similar structures, except that a start time (when it first appeared) and an end time (when it disappeared from the image) is associated with each character, word, and line.

The general approach is to successively update an agglomeration ("agg") structure with the OCR results from each video frame as they become available from the OCR engine. The agglomeration process can produce output in different modes of output: 1) output the agglomerated OCR results after every processed frame, 2) output the agglomerated OCR results only when there is a change in the text content of the scene, or 3) output individual text segments from the agglomerated structure immediately after those text segments have disappeared from the video sequence.

Since the segmentation of text lines may vary from frame to frame (because of changes in the scene, or because of slight variations the digitization of the same scene), there may not be a one-to-one correspondence between text lines in successive frames. For example, a line in one frame could overlap two different lines in another frame. In addition, from one frame to the next, the contents of a line of text may change, or characters may be added to a line of text. Therefore, the present approach looks for frame-to-frame changes based on a "character group" structure instead of on a line-by-line basis. A character group is defined as a group of consecutive characters in a text line that each overlap one or more characters in another frame.

A description and definition of the agglomeration algorithm is presented below.

$\{O_t\}$ is the set of OCR results for each frame t. $O_t$ is a hierarchical structure consisting of a set of lines $\{L_i\}$. Each line has a set of character slots, and each slot has one or more candidate character identities.

$\{L_i\}$ i=1 . . . I is the set of lines of OCR results in the agglomerated ("agg") structure $\{L'_i\}$ i=1 . . . I' is the set of lines of OCR results from the current ("curr") video frame $\{LP_j\}$ j=1 . . . J is the set of (agg, curr) line pairs that overlap $\{T_j\}$ j=1 . . . J is the set of geometrical transforms associated with each $LP_j$ A character group pair $CGP_k = \{\{CG_k\}, \{CG'_k\}\}$, where $CG_k$ are consecutive character slots that overlap one or more character slots in $CG'_k$, and $CG'_k$ are consecutive character slots that overlap one or more character slots in $CG_k$. There are five types of correspondences between character slots: 1:1, splits, merges, unaligned, and unmatched.

For each new frame t the algorithm operates as follows:

Step 1. From the two set of lines $\{L_i\}$ and $\{L'_i\}$ find pairs of overlapping lines $\{LP_j\}$ and their associated geometrical transform $\{T_j\}$. This step finds the correspondence between text regions in $A_t$ and $O_t$ by one or more methods: a) assuming that the position of the text in the image does not change from frame to frame, test the overlap of bounding boxes of the text lines, b) tracking various pixel data or characteristics of text regions that move from frame to frame (as in Step 220), and c) matching text regions across frames by the identity of their recognized characters, and then computing the geometrical transform between those that match.

Step 2. For each of the line pairs $LP_j$ and its associated geometrical transform $T_j$ find character group pairs $CGP_k$, k=1, . . . $K_j$. This step computes character-to-character correspondences by comparing the positions of the left and right sides of the bounding boxes of the character slots. Even when text is stationary in the image, this step permits a small amount of uncertainty in character position due to video capture jitter and differences in character segmentation by the OCR engine.

Step 3. Conditionally update each $CGP_k$:

3A. If curr text $CG'_k$ is new (different than the corresponding agg text $CG_k$ but in the same image position), and put $CG_k$ on the to-be-replaced list and mark it for output. If both character groups $CG'_k$ and $CG_k$ have a high average confidence and few 1:1 correspondences, or if both character groups have high-confidence characters in 1:1 correspondence that differ radically (i.e., not O/0, 1/I, etc.), then the text in $CG'_k$ is deemed different than the text in $CG_k$, and should be replaced.

3B. Else if $CG'_k$ is significantly better (as judged by average confidence value or probability) than $CG_k$, replace all the characters in $CG_k$ with the characters in $CG'_k$.

3C. Else update each 1:1, split, merge, and unaligned character slot in $CG_k$ with the corresponding character slot in $CG'_k$ if the latter character slot is significantly better (as judged by average confidence value or probability).

Step 4. Mark text in the agg structure $A_t$ that is not in the curr structure $O_t$ as deletions.

Step 5. Mark text in the curr structure $O_t$ that is not in the agg structure $A_t$ as insertions.

Step 6. Update the agg structure A, with the text marked for replacement, deletion, and insertion. This step updates the characters in $CG_k$ with the characters in $CG'_k$ based on two criteria: the confidence value or probability of each character identity, and frequency count (the number of frames in which each character is present in the OCR results).

Step 7. Output any part of the agg structure $A_t$ that should be output at time t.

As discussed above, the agglomeration process can operate in different output modes: 1) output the entire agglomerated OCR results after every processed frame, 2) output the agglomerated OCR results only when there is a change in the text content of the scene, or 3) output individual text segments from the agglomerated structure immediately after those segments have disappeared from the video sequence. For output modes 1 and 2, Step 6 would be executed before Step 7; for output mode 3, Step 7 would be executed before Step 6.

In an alternate form of agglomeration, the text detection and tracking process 220 forms line sequences; each line sequence corresponds to a single instance of a line of text that appears in multiple images or frames. The OCR results derived from a line sequence are represented by $S_t$, t=1, 2, . . . T, where T is the # of frames in the sequence. To agglomerate a line sequence, Steps 2 through 6 are run T times; in each run $S_t$ is treated as the "curr" structure. Step 1 is not executed, and Step 7 is executed after agglomerating the last line $S_T$ of the line sequence. This alternate form of agglomeration can also be used to combine multiple OCR results for the same text line appearing in the same frame (obtained after binarizing the same line of text multiple times with different threshold settings, as described in Step 240).

Returning to FIG. 2, in step 270, method 200 applies lexicon processing. Step 270 is achieved by first choosing hypothesized word identities from a lexicon that contain character substrings found in the OCR results produced by step 260. The process then selects the most likely hypothesized words by comparing their characters with the OCR results (including lesser-ranked candidate character identities).

Finally, in step 280, method 200 eliminates false text (i.e., text that is likely to be caused by graphic or other non-text elements in the image). False text is detected by a number of criteria, such as low confidence, brief time appearing in the imagery, and combinations of characters (especially non-alphabetic) within a word that occur infrequently (e.g., "[] Cz-13q").

One important aspect of the present invention is the ability to recognize scene text, such as street signs, name plates, and billboards, that is part of the video scene itself. Many text recognition efforts in video and still imagery have assumed that the text lies in a plane that is oriented roughly perpendicular to the optical axis of the camera. Of course, this assumption is valid for scanned document images and imagery containing overlaid text captions, but is not generally true for scene text. In fact, text information is often viewed from an oblique angle. Such a configuration is quite common when the main subject of the scene is not the text itself, but such incidental text could be quiet important (for example, it may be the only clue of the location of the captured imagery).

Figure 3:
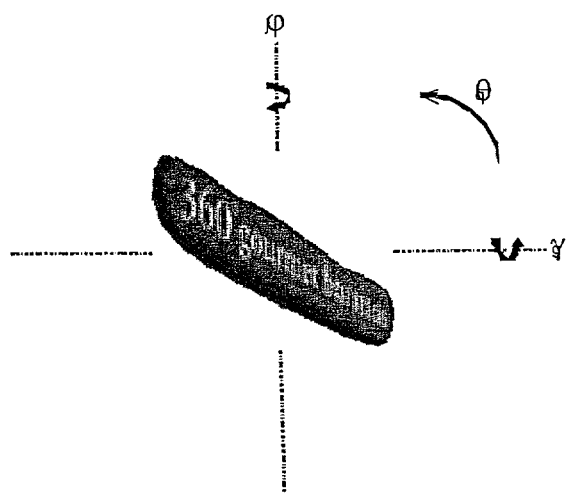
FIG. 3 illustrates the orientation angle of text relative to a camera can be modeled in terms of three angles.

To address the problem of recognizing text that lies on a planar surface in 3-D space, one should note that the orientation angle of such text relative to the camera can be modeled in terms of three angles, as shown in FIG. 3:

$\theta$, the rotation in the plane perpendicular to the camera's optical axis $\Phi$ and $\gamma$, the horizontal (azimuth) and vertical (elevation) components, respectively, of the angles formed by the normal to the text plane and the optical axis.

Figure 5:
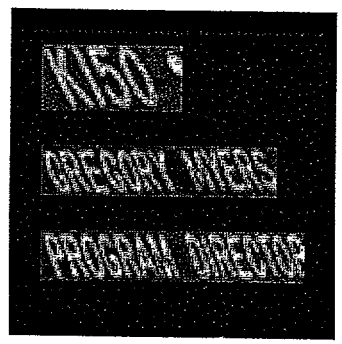
FIG. 5 illustrates characters becoming sheared after in-plane rotation.

The three angles represent the amount of rotation that the text plane must undergo relative to the camera in each of its three axes to yield a frontal, horizontal view of the plane in the camera's field of view. When $\theta$ and $\gamma$ are zero and $\Phi$ is nonzero, the apparent width of the text is reduced, resulting in a change in aspect ratio and a loss of horizontal resolution. Similarly, when $\theta$ and $\Phi$ are zero and $\gamma$ is nonzero, the text appears to be squashed vertically. The severity of perspective distortion is proportional to D/Z, where D is the extent of the text parallel to the optical axis (its "depth") and Z is the distance from the text to the camera. When the text is not centered at the optical axis or both $\Phi$ and $\gamma$ are nonzero, the text appears to be rotated in the image plane (see FIG. 4). If the text were rotated to remove this apparent angle by a text recognition process that mistakenly assumed the text is fronto-parallel, the characters would become sheared (see FIG. 5). When both $\Phi$ and $\gamma$ are nonzero and perspective distortion is significant, the shearing angle varies from left to right within the text region. OCR engines perform poorly if the shearing causes characters to touch or to be severely kerned (overlapped vertically).

When the plane that contains the text is at an angle relative to the image plane, several types of distortions can be introduced that make it difficult to read the text. In the most general case, the distortion is described as a projective transformation (or homography) between the plane containing the text and the image plane. The present invention can correct this distortion by applying the appropriate "corrective" projective transformation to the image. That is, the present method can rotate and stretch the original image to create a synthetic image, which is referred to as a "rectified image," in which the projective distortion has been removed.

In general, a two-dimensional projective transformation has eight degrees of freedom. Four correspond to a Euclidean 2-D transformation (translations along two axes $t_x$ and $t_y$, a rotation r, and an isotropic scale factor s); two correspond to an affine transformation (a shear a and a nonisotropic scaling b of one axis relative to the other); and the remaining two degrees of freedom represent a perspective foreshortening along the two axes $f_x$ and $f_y$.

From an OCR point of view, some of the eight parameters produce changes that are harder to handle than others. In particular, the two translations are not a problem, because they simply produce an image shift that is naturally handled by OCR systems. Similarly, the two scale factors are not a problem, because the OCR systems typically include mechanisms to work at multiple scales. The Euclidean rotation is important, but is easily computed from a line of text. Therefore, three critical parameters produce distortions that are difficult for OCR systems to handle: the two perspective foreshortening parameters and the shearing.

In the present approach, estimates of the plane parameters are computed from the orientations of the lines of text in the image and the borders of planar patch, if they are visible. To remove a projective distortion, the present invention computes the three critical degrees of freedom associated with the plane on which the text is written. In general, the present invention can accomplish this task by identifying three geometric constraints associated with the plane. For example, one can compute the necessary parameters, given two orthogonal pairs of parallel lines, such as the borders of a rectangular sign or two parallel lines of text and a set of vertical strokes within the text. The three constraints derivable from these sets of lines are two vanishing points (one from each set of parallel lines) and an orthogonality constraint between the set of lines.

Sometimes, however, such linear properties are difficult to detect. In such cases, the present invention can estimate the parameters by making assumptions about the camera-to-plane imaging geometry that are often true. For example, people normally take pictures so that the horizon is horizontal in the image. In other words, they seldom rotate the camera about its principal axis. In addition, they often keep the axis of the camera relatively horizontal. That is, they do not tilt the camera up or down very much. When these two assumptions apply and the text lies on a vertical plane, such as a wall of a building or a billboard, the projective distortion is only along the X axis of the image. The perspective foreshortening in that direction can be computed from one constraint, such as a pair of horizontal parallel lines.

Another assumption that often holds is that the perspective effects are significantly smaller than the effects caused by the out-of-plane rotations. This is the case if the depth variation in the text is small compared with the distance from the camera to the plane. In this case, the perspective distortion is reduced to an affine shear and the projection is described as a weak perspective projection.

Given these relationships, the general strategy is to identify as many properties of a region of text as possible, and then compute a corrective transformation, using as few assumptions as possible. Initially, the present invention uses information derived independently from each individual line of text. Next, the present invention combines information from multiple text lines after partitioning them into sets of lines that lie within a common plane. The method then further augments the process by detecting auxiliary lines that can provide horizontal and vertical cues. These can include lines in the same plane as the text (such as sign borders), and extraneous lines (e.g., building edges). Finally, depending upon the success in finding these features, one can either make assumptions to substitute for missing constraints (and then compute a transformation that corrects for a full perspective projection) or compute a transformation that does not completely remove all degrees of freedom.

In one embodiment, each text line is rectified in a single image independently. After possible lines of text are detected, various features of each text line are then estimated. These include the top and base lines, and the dominant vertical direction of the character strokes. The rectification parameters for each text line are computed from these characteristics. Each text line is then rectified independently and sent to an OCR engine.

Figure 6:
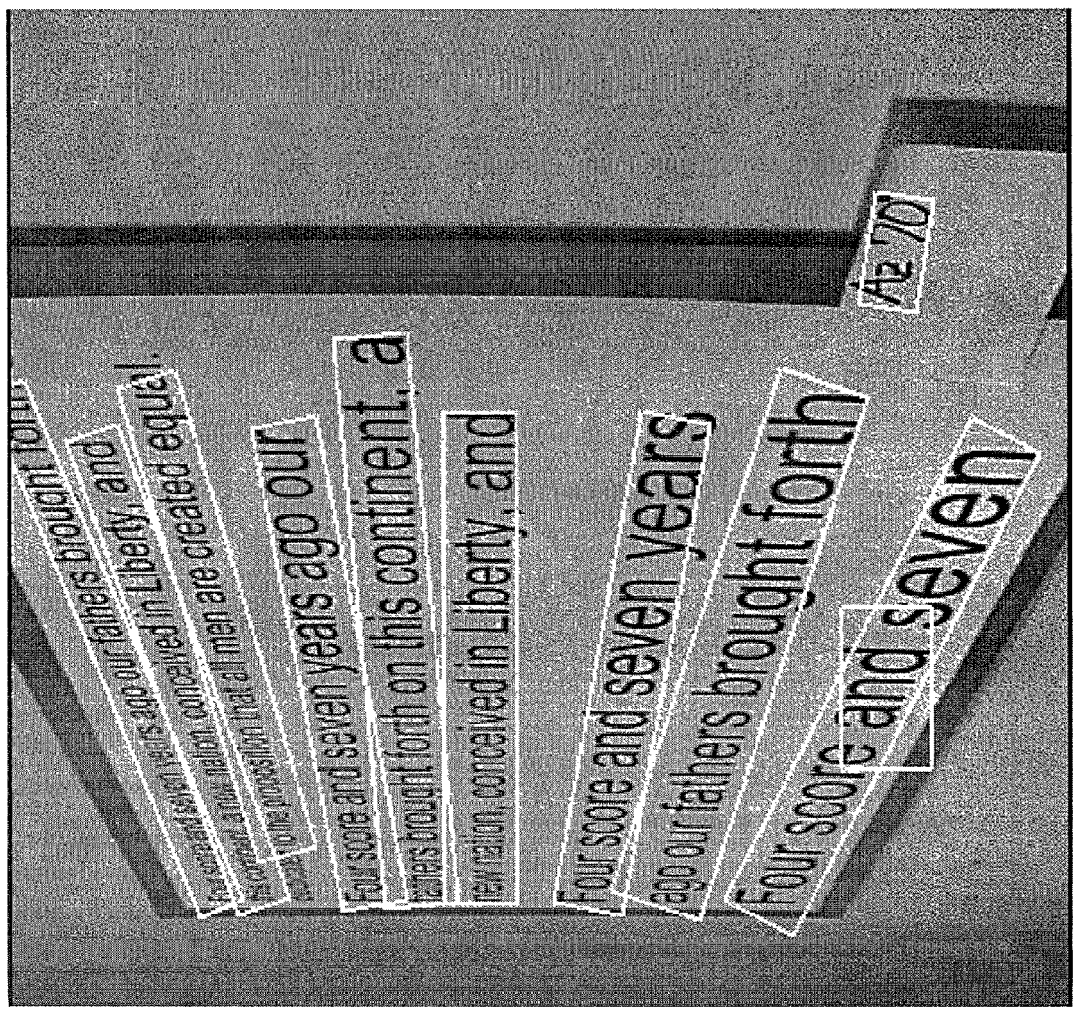
FIG. 6 illustrates a test image of a poster containing text that was captured at an azimuth angle of 70 degrees.

FIG. 6 illustrates a test image of a poster containing text that was captured at an azimuth angle of 70 degrees; the rectangles that have been fitted to each detected text line are shown in overlay. (Some of the rectangles do not look to the eye like true rectangles because of the perspective view of the image contents). Computing the best-fitting rectangle for each text line is an expedient way to approximate the location and extent of the text, but the top and bottom of the text are not accurately computed when significant perspective distortion is present.

Figure 7:
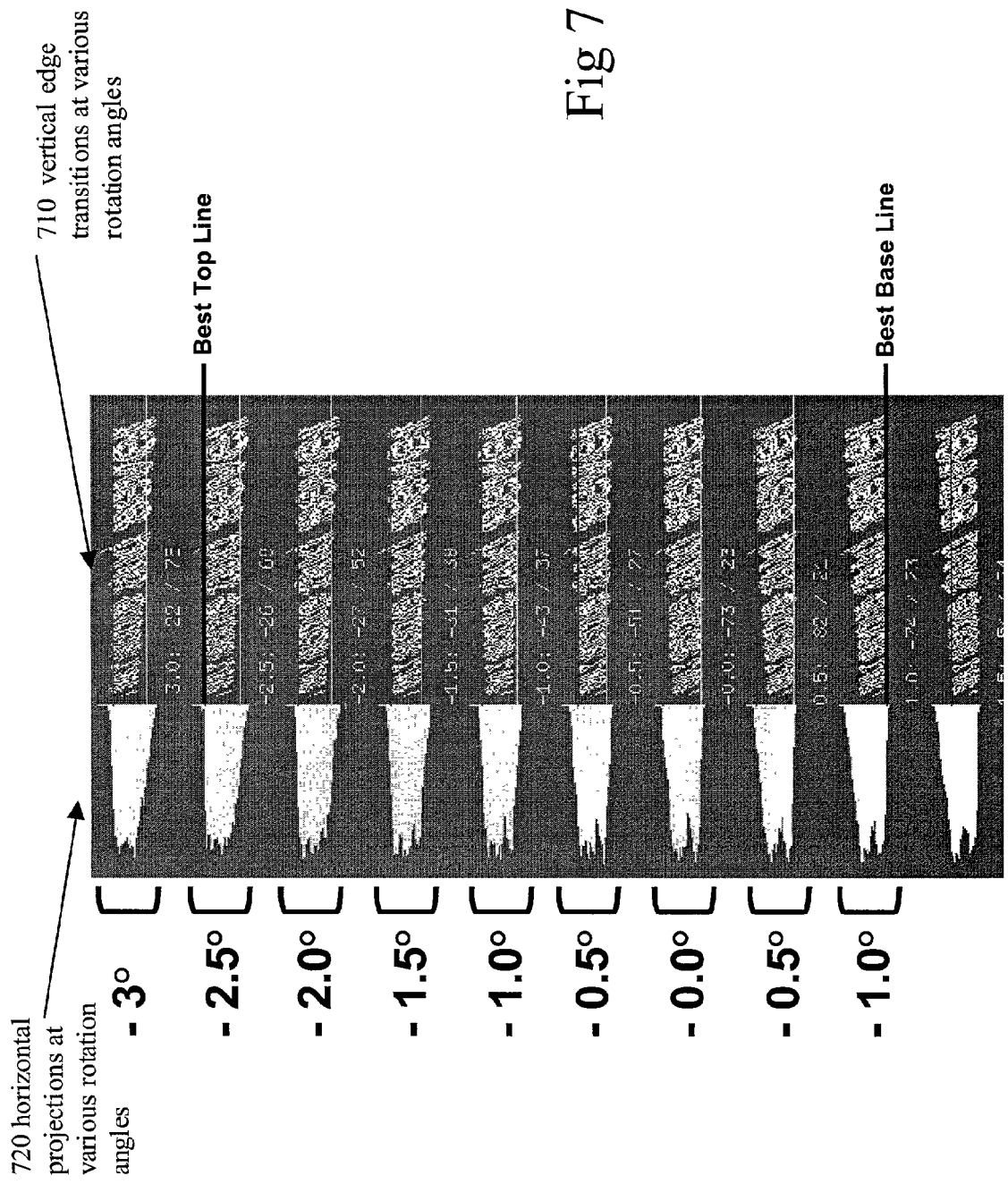
FIG. 7 illustrates a method for estimating top line and bottom line.

A top line and base line for each line of text are estimated by rotating the text line at various angles and then computing a series of horizontal projections 720 over the vertical edge transitions 710 in FIG. 7. (When the text consists of predominantly lower-case characters, the "top" line actually corresponds to the "midline" of the text that touches the tops of lower-case characters, excluding their ascenders.) The best estimate of the bottom line should correspond to the rotation angle that yields the steepest slope on the bottom side of the horizontal projection. Specifically, to refine the bottom baseline, a bottom edge pixel is located for each column in the initial rectangular bounding box. These bottom edge pixels are then rotated through a series of angles around the original estimated text angle and summed horizontally along each row, P[r]. The angle with the maximum sum of squared projections (sum(P[r]*P[r])) is the baseline angle and the maximum projection is the baseline position. For speed, a binary search is used to locate this maximum projected angle. The process is repeated for the top baseline using only the top edge pixels in each column. FIG. 7 shows an example of this procedure.

Figure 8:
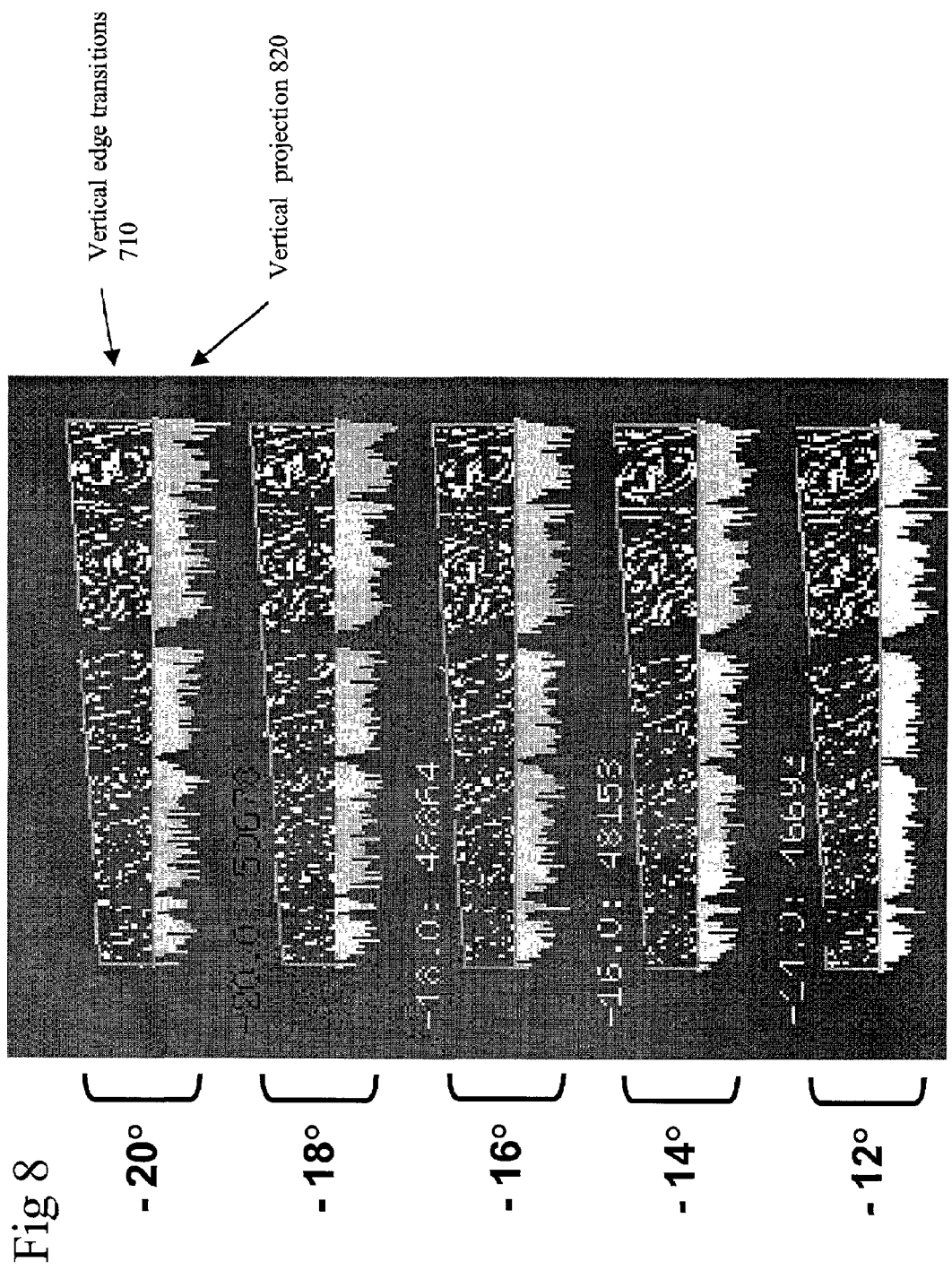
FIG. 8 illustrates an example of shear computation.

It should be noted that in addition to computing two horizontally oriented lines, one would like to find and measure the angles of two vertically oriented lines to use in the computation of the rectification parameters. Unfortunately, an individual line of text does not have much vertical extent, and it is difficult to determine which parts of the text could be used as vertical cues. However, the height of the text is not usually a significant fraction of the depth of the text in 3-D space, so that the perspective foreshortening in the Y dimension should be relatively small. Therefore, in the absence of any other reliable vertical cues, the present method computes the dominant vertical direction (shear) of the text by computing a series of vertical projections 820 over the vertical edge transitions after rotation the text line in 2-degree increments. The best estimate of the dominant vertical direction should correspond to the angle at which the sum of squares of the vertical projection is a maximum (on the assumption that the projection of true vertical strokes is greatest when they are rotated to a vertical position). FIG. 8 shows an example of shear computation.

Figure 9:
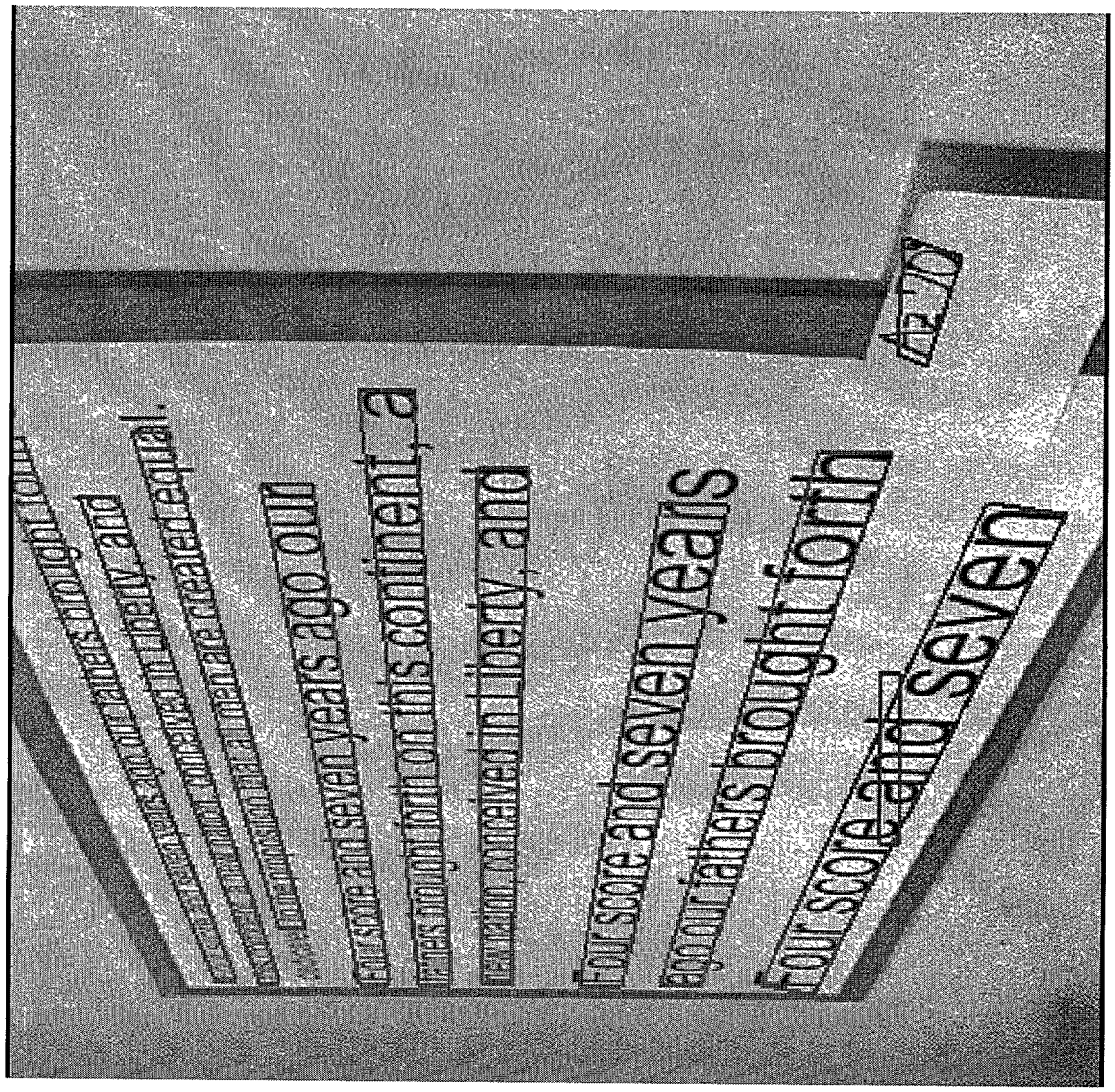
FIG. 9 illustrates refined bounding boxes based on the top and base lines and on the dominant vertical direction.
Figure 10:
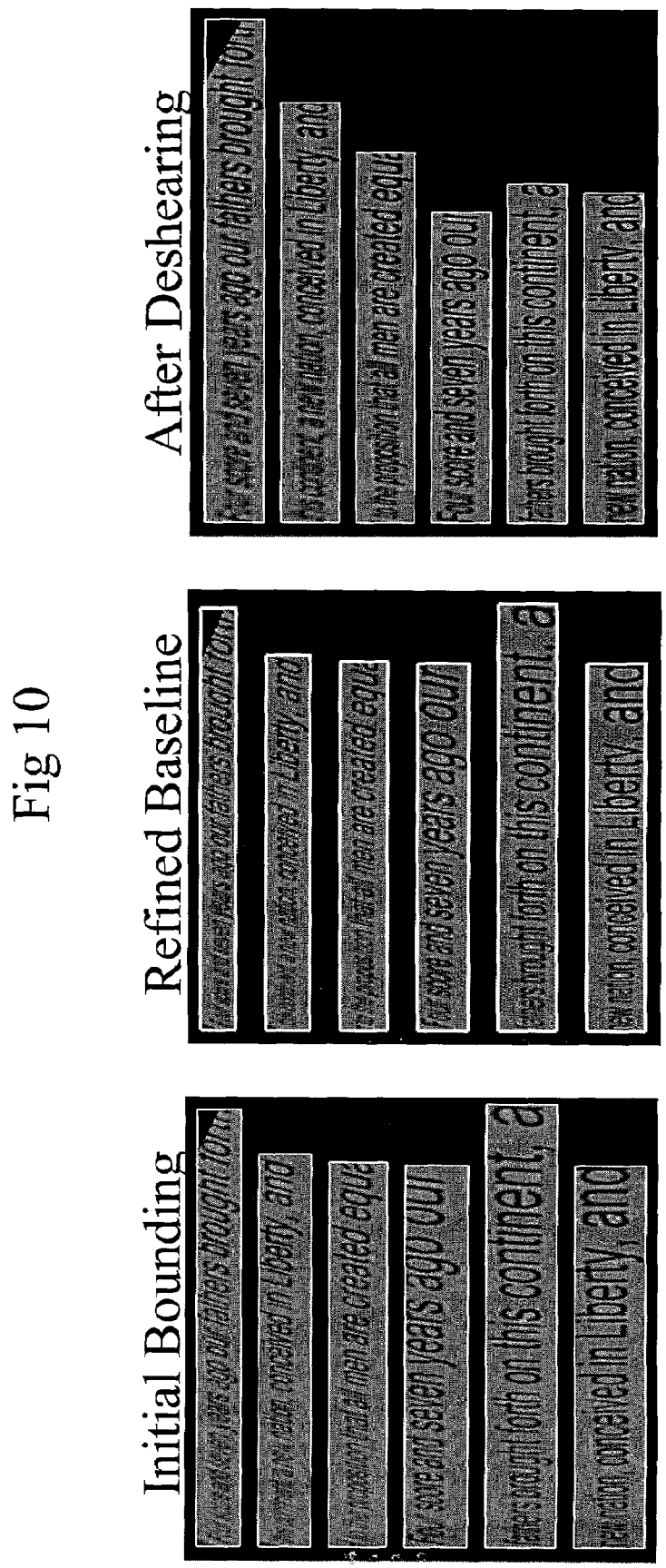
FIG. 10 illustrates the warped text lines after the baseline refinement and deshearing.

FIG. 9 illustrates the refined bounding boxes based on the top and base lines and on the dominant vertical direction. FIG. 10 illustrates the rectified text lines (a) after the initial rectangular bounding box is deskewed; (b) after the baseline is refined (without including the top line in the dewarping computation) and then deskewed; and (c) after the lines are desheared.

The transformation used to rectify the image of each text line, $I_j$, occurring in an obliquely viewed image, $O_i$, is a projective transformation, $T_{ij}$, of the text plane. This transformation is described by:

$$m'=Hm,$$

where H is a 3×3 matrix that maps the homogeneous coordinates $$m = \begin{bmatrix} x \\ y \\ 1 \end{bmatrix}$$

in $O_i$ to the homogeneous rectified coordinates m'=EAPm in a normalized image $N_i$, where:
   m=coordinates in the video image
   m'=coordinates in the normalized image
   E=Euclidian transformation
   A=Affine transformation
   P=Projective transformation where:

$$E = \begin{pmatrix} s\cos r & s\sin r & t_x \\ s\sin r & s\cos r & t_y \\ 0 & 0 & 1 \end{pmatrix} \quad A = \begin{pmatrix} 1/b & -a/b & 0 \\ 0 & 1 & 0 \\ 0 & 0 & 1 \end{pmatrix} \quad P = \begin{pmatrix} f & 0 & 0 \\ 0 & f & 0 \\ l_x & l_y & f \end{pmatrix}$$

Figure 11:
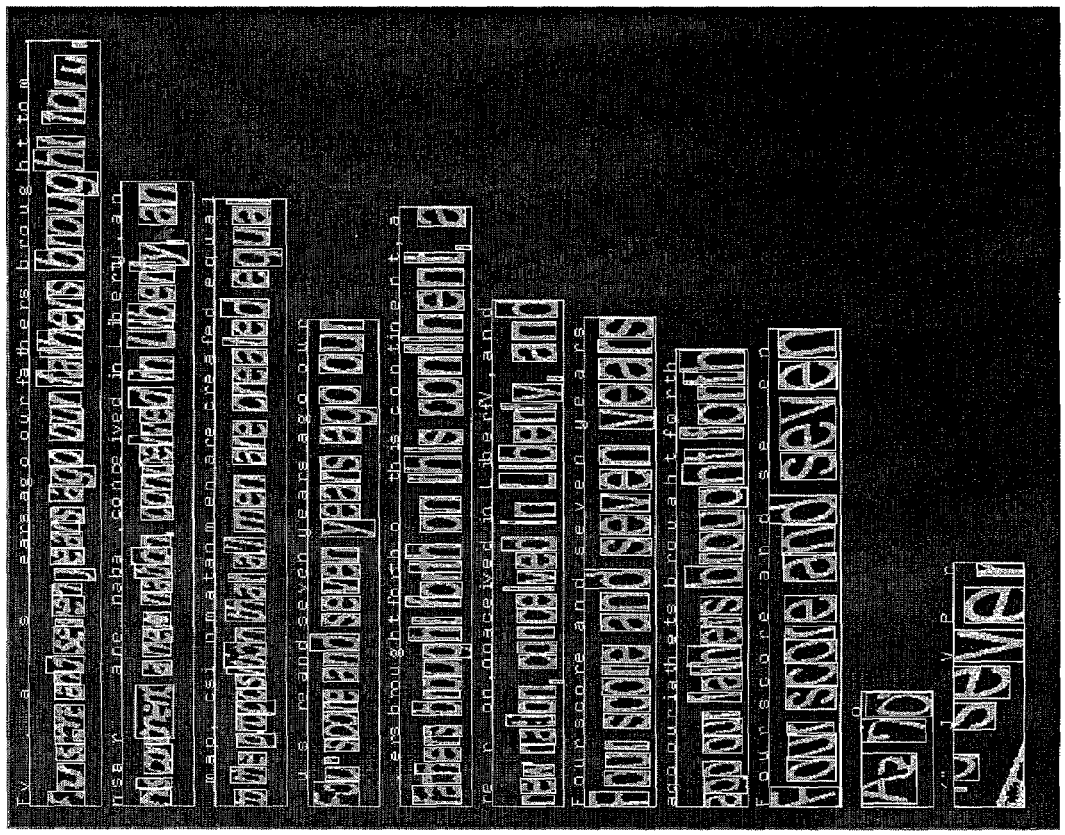
FIG. 11 illustrates a 70 degree azimuth test image, with the recognition results overlaid on the normalized image.

The horizontal and vertical vanishing points are mapped to the points at infinity in the horizontal and vertical directions. This process takes care of the perspective foreshortening in both directions, as well as the skew and rotation. The remaining four degrees of freedom correspond to the origin and scale factors that place the line in the normalized image $N_i$. The image $N_i$, which contains all of the rectified lines from image $O_i$, is then sent through the OCR process. FIG. 11 shows, for the 70 degree azimuth test image, with the recognition results overlaid on the normalized image.

Although various embodiments which incorporate the teachings of the present invention have been shown and described in detail herein, those skilled in the art can readily devise many other varied embodiments that still incorporate these teachings.

What is claimed is:

1. Method for recognizing text in a captured imagery, said method comprising the steps of:
   (a) detecting a text region in the captured imagery;
   (b) adjusting said detected text region to produce a rectified image;
   (c) applying optical character recognition (OCR) processing to said rectified image to recognize the text in the captured imagery;
   wherein said adjusting step (b) comprises the step of (b1) computing a base line and a top line for a line of detected text within said detected text region;
   wherein said base line and said top line are estimated by rotating said line of detected text at various angles and then computing a plurality of horizontal projections over a plurality of vertical edge projections; and
   wherein said base line is selected that corresponds to a rotation angle that yields a steepest slope on a bottom side of one of said plurality of horizontal projections.

2. Method for recognizing text in a captured imagery, said method comprising the steps of:
   (a) detecting a text region in the captured imagery;
   (b) adjusting said detected text region to produce a rectified image;
   (c) applying optical character recognition (OCR) processing to said rectified image to recognize the text in the captured imagery;
   wherein said adjusting step (b) comprises the step of (b1) computing a base line and a top line for a line of detected text within said detected text region;
   wherein said base line and said top line are estimated by rotating said line of detected text at various angles and then computing a plurality of horizontal projections over a plurality of vertical edge projections; and
   wherein said top line is selected that corresponds to a rotation angle that yields a steepest slope on a top side of one of said plurality of horizontal projections.

3. Method for recognizing text in a captured imagery, said method comprising the steps of:
   (a) detecting a text region in the captured imagery;
   (b) adjusting said detected text region to produce a rectified image;
   (c) applying optical character recognition (OCR) processing to said rectified image to recognize the text in the captured imagery;
   wherein said adjusting step (b) comprises the step of (b1) computing a base line and a top line for a line of detected text within said detected text region;
   said adjusting step (b) further comprises the step of (b2) computing a dominant vertical direction of character strokes for a line of detected text within said detected text region; and
   wherein said dominant vertical direction computing step (b2) comprises the step of computing a plurality of vertical projections over a plurality of vertical edge transitions after rotating said line of detected text in a plurality of degree increments.

4. The method of claim 3, wherein said dominant vertical direction is selected that corresponds to an angle where a sum of squares of said vertical projections is a maximum.

5. Apparatus for recognizing text in a captured imagery, said apparatus comprising:
   means for detecting a text region in the captured imagery;
   means for adjusting said detected text region to produce a rectified image; and
   means for applying optical character recognition (OCR) processing to said rectified image to recognize the text in the captured imagery;
   wherein said adjusting means computes a base line and a top line for a line of detected text within said detected text region;
   wherein said base line and said top line are estimated by rotating said line of detected text at various angles and then computing a plurality of horizontal projections over a plurality of vertical edge projections; and
   wherein said base line is selected that corresponds to a rotation angle that yields a steepest slope on a bottom side of one of said plurality of horizontal projections.

6. Apparatus for recognizing text in a captured imagery, said apparatus comprising:
   means for detecting a text region in the captured imagery;
   means for adjusting said detected text region to produce a rectified image; and
   means for applying optical character recognition (OCR) processing to said rectified image to recognize the text in the captured imagery;
   wherein said adjusting means computes a base line and a top line for a line of detected text within said detected text region;
   wherein said base line and said top line are estimated by rotating said line of detected text at various angles and then computing a plurality of horizontal projections over a plurality of vertical edge projections; and wherein said top line is selected that corresponds to a rotation angle that yields a steepest slope on a top side of one of said plurality of horizontal projections.

7. Apparatus for recognizing text in a captured imagery, said apparatus comprising:

means for detecting a text region in the captured imagery;

means for adjusting said detected text region to produce a rectified image; and means for applying optical character recognition (OCR) processing to said rectified image to recognize the text in the captured imagery;

wherein said adjusting means computes a base line and a top line for a line of detected text within said detected text region;

wherein said adjusting means further computes a dominant vertical direction of character strokes for a line of detected text within said detected text region; and wherein said adjusting means computes said dominant vertical direction by computing a plurality of vertical projections over a plurality of vertical edge transitions after rotating said line of detected text in a plurality of degree increments.

8. Method for recognizing text in a captured imagery, where said captured imagery is of a three-dimensional scene, said method comprising the steps of:

(a) detecting a text region in the captured imagery;

(b) adjusting along three axes said detected text region to produce a rectified image, wherein said adjusting comprises the steps of:

(b1) computing a base line and a top line for a line of detected text within said detected text region; and (b2) computing a dominant vertical direction of character strokes for a line of detected text within said detected text region, wherein said dominant vertical direction computing further comprises the step of computing a plurality of vertical projections over a plurality of vertical edge transitions after rotating said line of detected text in a plurality of degree increments; and (c) applying optical character recognition (OCR) processing to said rectified image to recognize the text in the captured imagery.

* * * * *